(12) United States Patent
Mangadlao

(10) Patent No.: US 11,396,581 B2
(45) Date of Patent: Jul. 26, 2022

(54) OXYALKYLATED POLYBENZOXAZINE EMULSION BREAKERS

(71) Applicant: Joey Dacula Mangadlao, Sugar Land, TX (US)

(72) Inventor: Joey Dacula Mangadlao, Sugar Land, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 162 days.

(21) Appl. No.: 16/869,810

(22) Filed: May 8, 2020

(65) Prior Publication Data

US 2021/0347951 A1  Nov. 11, 2021

(51) Int. Cl.
  *C08G 73/02* (2006.01)
  *C08L 61/06* (2006.01)
  *B01D 17/04* (2006.01)

(52) U.S. Cl.
  CPC ....... *C08G 73/0233* (2013.01); *B01D 17/047* (2013.01); *C08L 61/06* (2013.01)

(58) Field of Classification Search
  CPC .. C08G 73/02; C08G 73/0233; B01D 17/047; C08L 61/06
  See application file for complete search history.

(56) References Cited

U.S. PATENT DOCUMENTS

| | | | | |
|---|---|---|---|---|
| 4,209,422 A | * | 6/1980 | Zimmerman | B01D 17/047 44/433 |
| 4,935,162 A | * | 6/1990 | Barthold | C10G 33/04 208/188 |
| 5,543,516 A | | 8/1996 | Ishida | |
| 5,921,911 A | | 7/1999 | Hart | |
| 7,041,772 B2 | | 5/2006 | Aizawa et al. | |
| 8,540,885 B2 | | 9/2013 | Ebert et al. | |
| 11,083,981 B2 | | 8/2021 | Subramaniyam | |
| 2012/0058069 A1 | * | 3/2012 | Taden | C08G 73/02 424/70.11 |
| 2012/0232171 A1 | | 9/2012 | Cohrs et al. | |
| 2015/0218429 A1 | * | 8/2015 | Salnikov | C08G 65/26 525/66 |

FOREIGN PATENT DOCUMENTS

| | | | |
|---|---|---|---|
| JP | H02160899 A | * | 6/1990 |
| JP | H02160899 A | | 6/1990 |
| WO | 2011025652 A1 | | 3/2011 |
| WO | 2018138595 A1 | | 8/2018 |

OTHER PUBLICATIONS

Arslan et al.; Macromolecules, 2015, p. 1329-1334.*
International Search Report for International Application No. PCT/US2021/030861, International Filing Date May 5, 2021, dated Aug. 23, 2021, 5 pages.
Written Opinion for International Application No. PCT/US2021/030861, International Filing Date May 5, 2021, dated Aug. 23, 2021, 3 pages.

* cited by examiner

*Primary Examiner* — Robert S Jones, Jr.
(74) *Attorney, Agent, or Firm* — Cantor Colburn LLP

(57) ABSTRACT

A demulsifier composition comprises an oxyalkylated polybenzoxazine having repeating units of Formula (I):

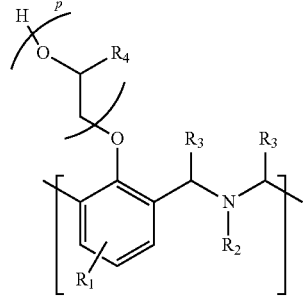

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; $R_3$ is hydrogen or a $C_{1-10}$ alkyl; each occurrence of $R_4$ is independently hydrogen or a $C_{1-5}$ alkyl; and p is at least 1.

15 Claims, No Drawings

OXYALKYLATED POLYBENZOXAZINE EMULSION BREAKERS

BACKGROUND

An emulsion is a system containing at least two immiscible liquids in which one liquid is dispersed as small droplets into the other liquid. Oil and water emulsions are often encountered in crude oil production and refining operations. If untreated, emulsions can slow the production flow and reduce the value of crude oils. The presence of excessive amount of water in crude oil can also interfere with refinery operations by inducing corrosion, poisoning catalysts, and reducing the handling capacity of pipelines and refining equipment.

One way to break emulsions is to use emulsion breakers to disrupt the interfacial films surrounding the droplets so that the droplets coalesce and form a layer, which can be separated from the other liquid. Emulsion breakers are also referred to as demulsifiers. Various demulsifiers are known in the art. However, due to the high demand for emulsion breakers, alternative materials and methods for breaking emulsions would be well received in the art.

BRIEF DESCRIPTION

A demulsifier composition comprises an oxyalkylated polybenzoxazine having repeating units of Formula (I):

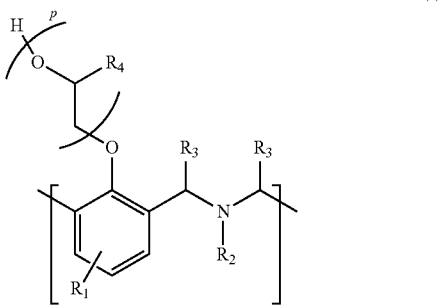

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; $R_3$ is hydrogen or a $C_{1-10}$ alkyl; each occurrence of $R_4$ is independently hydrogen or a $C_{1-5}$ alkyl; and p is at least 1.

A method of breaking an emulsion comprises contacting the emulsion with an oxyalkylated polybenzoxazine, the oxyalkylated polybenzoxazine comprising structural units of Formula (I) as described herein above.

DETAILED DESCRIPTION

The inventors hereof have found that oxyalkylated polybenzoxazines can be used as a demulsifier to break emulsions. As used herein, "oxyalkylated polybenzoxazines" mean homopolymers or copolymers comprising repeating structural units of Formula (I):

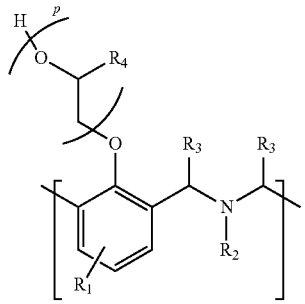

Formula (I)

wherein $R_1$ is hydrogen, a $C_{1-30}$ alkyl, a $C_{3-30}$ cycloalkyl, a $C_{6-30}$ aryl, a $C_{7-30}$ alkylaryl, a $C_{7-30}$ arylalkyl, a $C_{5-30}$ heteroaryl, or a $C_{3-30}$ heterocycloalkyl; $R_2$ is a $C_{1-30}$ alkyl, a $C_{3-30}$ cycloalkyl, a $C_{6-30}$ aryl, a $C_{7-30}$ alkylaryl, a $C_{7-30}$ arylalkyl, a $C_{5-30}$ heteroaryl, or a $C_{3-30}$ heterocycloalkyl; $R_3$ is hydrogen or a $C_{1-10}$ alkyl; each occurrence of $R_4$ is independently hydrogen or a $C_{1-5}$ alkyl, preferably hydrogen or methyl; and p is at least 1. $R_1$ is preferably para to the oxyalkylate substituent.

In an aspect, $R_1$ is hydrogen, a $C_{1-20}$ alkyl, a $C_{5-20}$ cycloalkyl, a $C_{6-18}$ aryl, a $C_{7-25}$ alkylarylene, a $C_{7-25}$ arylalkyl, a $C_{5-20}$ heteroaryl, or a $C_{5-30}$ heterocycloalkyl; $R_2$ is a $C_{1-20}$ alkyl, a $C_{5-20}$ cycloalkyl, a $C_{6-18}$ aryl, a $C_{7-25}$ alkylarylene, a $C_{7-25}$ arylalkyl, a $C_{5-20}$ heteroaryl, or a $C_{5-30}$ heterocycloalkyl; $R_3$ is hydrogen or a $C_{1-5}$ alkyl, preferably hydrogen; each occurrence of $R_4$ is independently hydrogen or methyl; and p is about 3 to about 900.

Preferably each of $R_1$ and $R_2$ is independently a $C_{4-18}$ alkyl or a $C_{4-12}$ alkyl such as dodecyl, nonyl, hexyl, t-butyl, and the like. $R_1$ and $R_2$ can be substituted or unsubstituted regardless whether substituted or unsubstituted is specifically mentioned or not. $R_3$ is preferably hydrogen.

As used herein, the term "alkyl" refers to a straight or branched chain, saturated monovalent hydrocarbon group regardless whether straight or branched chain is specifically mentioned or not. "Cycloalkyl" refers to a non-aromatic monovalent monocyclic or multicylic hydrocarbon group having at least three carbon atoms with cyclohexyl and cyclopentyl being exemplary cycloalkyl group. "Aryl" refers to an aromatic monovalent group containing only carbon in the aromatic ring or rings with phenyl being an exemplary aryl group. "Alkylaryl" refers to an aryl group that has been substituted with an alkyl group as defined above, with 4-methylphenyl being an exemplary alkylaryl group. "Arylalkyl" refers to an alkyl group that has been substituted with an aryl group or an alkylaryl group as defined above, with benzyl and xylyl being exemplary arylalkyl groups. "Heteroaryl" refers to an aromatic monovalent group containing carbon and at least a heteroatom in the aromatic ring or rings, wherein the heteroatom includes N, O, or S with pyridinyl being an exemplary heteroaryl group. "Heterocycloalkyl" refers to a non-aromatic monovalent monocyclic or multicylic group having at least three carbon atoms and at least one heteroatom such as N, O, or S.

Unless otherwise indicated, each of the foregoing groups for $R_1$, $R_2$, $R_3$, and $R_4$ can be unsubstituted or substituted, provided that the substitution does not significantly adversely affect synthesis, stability, or use of the compound. The term "substituted" as used herein means that at least one hydrogen on the designated atom or group is replaced with another group, provided that the designated atom's normal valence is not exceeded. Exemplary groups that can be present on a "substituted" position include, but are not limited to, a halogen, a group having an N, S, O, or F atom, alkyl, cycloalkyl, alkenyl, or alkynyl.

Oxyalkylated polybenzoxazines can be derived from a polybenzoxazine having repeating structural units of Formula (VI) and one or more alkylene oxides according to Scheme 1:

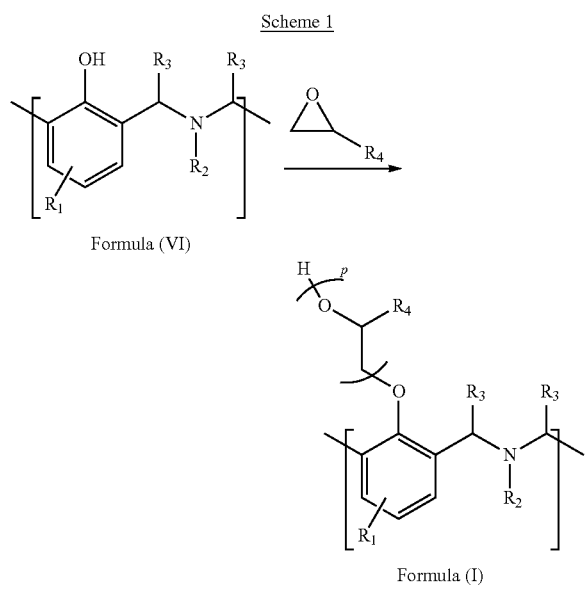

wherein $R_1$, $R_2$, $R_3$, $R_4$, and subscript p are as defined herein in the context of Formula (I).

Examples of alkylene oxides include ethylene oxide, propylene oxide, and 1,2-epoxybutane. The polybenzoxazine can react with one specific alkylene oxide, such as ethylene oxide or propylene oxide. Alternatively, the polybenzoxazine can react with more than one alkylene oxides. For example, the polybenzoxazine can react with both ethylene oxide and propylene oxide.

When two or more alkylene oxides are used, the alkylene oxides may be added in a random or block fashion. In a random addition process, two or more alkylene oxides can be added to the polybenzoxazine simultaneously. The alkylene oxides can be pre-mixed first then added to the polybenzoxazine. Alternatively or in addition, the alkylene oxides can be separately added to the polybenzoxazine at the same time.

In the case of block addition, one alkylene oxide is added first to the polybenzoxazine and allowed to react. Then another alkylene oxide is added and allowed to react. An oxyalkylated polybenzoxazine prepared by block addition of alkylene oxides can be referred to as a "block copolymer".

In an aspect, the alkylene oxides comprise ethylene oxide and propylene oxide. The ethylene oxide and propylene oxide can be added in a block fashion or a random fashion, preferably a block fashion. For example, ethylene oxide and propylene oxide can be added in the sequence of ethylene oxide and propylene oxide. As another specific example, the ethylene oxide and propylene oxide are added in the sequence of ethylene oxide, propylene oxide, and ethylene oxide.

To make the oxyalkylated polybenzoxazines, the polybenzoxazine is reacted with at least one molar equivalent of alkylene oxides. Preferably, the polybenzoxazine is reacted with about 10 to about 1,000 molar equivalents of alkylene oxides. More preferably, the polybenzoxazine is reacted with about 1 to about 300 molar equivalents of ethylene oxide/propylene oxide.

In the preparation of the polybenzoxazine having repeating structural units of Formula (VI), any benzoxazine compound may be used. Benzoxazines may be prepared by combining a phenolic compound, an aldehyde, and a primary amine compound as described, for example, in U.S. Pat. Nos. 5,543,516 and 7,041,772. The reaction is illustrated in Scheme 2.

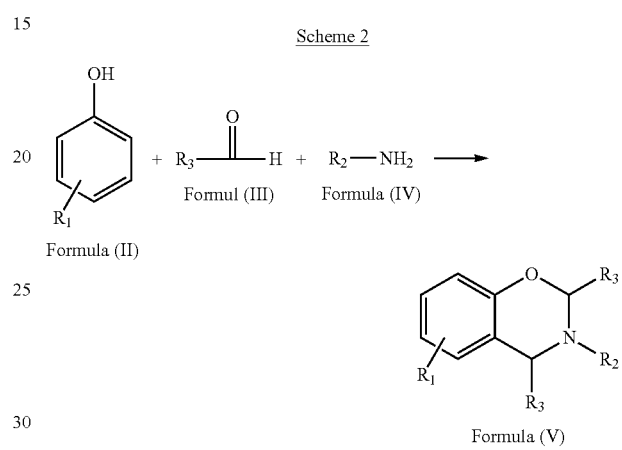

The phenolic compound (monophenol) can be substituted or unsubstituted. The substituents can be attached to the para, ortho, or both positions of the monophenol. Preferably the substituents are attached to the para position of the monophenol. Substituted phenol can be an alkyl substituted monophenol. The alkyl substituents include $C_{1-20}$, $C_{4-18}$, or $C_{4-12}$ branched or linear alkyl groups. Exemplary phenols having branched alkyl groups include branched dodecyl phenol, branched nonyl phenol, tert-butylphenol, t-amyl phenol, and branched hexyl phenols such as 4-(1-methylpentyl) phenol, 4-(1,2-dimethylbutyl)phenol, and 4-(1-ethylbutyl) phenol, and 4-(1-ethyl-2-methylpropyl) phenol.

Examples of aldehydes include formaldehyde, paraformaldehyde, acetaldehyde, propionaldehyde, butyraldehyde, glyoxal, glutaraldehyde, 1,9-nonanedial, or a combination comprising at least one of the foregoing. Paraformaldehyde and formaldehyde are preferred.

The amines are preferably primary amines with the Formula (IV). Examples of the primary amine include dodecyl amine, oleylamine, 2-ethylhexylamine, octylamine, naphthylamine, benzylamine and polyamines.

When polymerized, the benzoxazines of Formula (V) undergo ring opening to produce polybenzoxazines having repeating structural units of Formula (VI). The reaction conditions are known to a person skilled in the art, and have been described for example in WO 2011/025652.

The oxyalkylated polybenzoxazines as described herein are excellent emulsion demulsifiers. The amount of the oxyalkylated polybenzoxazines used to break emulsions can vary depending on the specific oxyalkylated polybenzoxazines used, the specific chemistry of the emulsions to be treated, as well as the conditions such as the pressure and temperature that the emulsions are exposed to. In an embodiment, about 1 ppm to about 1,000 ppm or about 50 ppm to about 500 ppm of the oxyalkylated polybenzoxazines are used to treat the emulsions based on the total weight of the emulsions.

The oxyalkylated polybenzoxazines can be used alone or in combination with other emulsion breakers, such as complex esters, alkoxylated phenols, alkoxylated alcohols, polyethylene or polypropylene glycols and their derivatives, arylsulfonates, oxyalkylated phenol aldehyde resins, or a combination comprising at least one of the foregoing. The phenol aldehyde resins include repeating structural units having the Formula (VII)

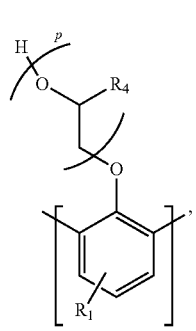

Formula (VII)

wherein $R_1$ is $C_{1-20}$, $C_{4-18}$, or $C_{4-12}$ branched or linear alkyl groups; each occurrence of $R_4$ is independently hydrogen or methyl; and p is at least 1.

The relative amounts of the other emulsion breakers and the oxyalkylated polybenzoxazines can be determined depending on the specific emulsion breakers used, and the specific chemistry of the emulsions to be treated. In an embodiment, the weight ratio of the oxyalkylated polybenzoxazines relative to the other emulsion breakers is about 99:1 to about 1:99, or about 99:1 to about 1:10, or about 95:1 to about 5:1.

It is appreciated that both the oxyalkylated polybenzoxazines and the other emulsion breakers can be added to the emulsions in the form of solutions or dispersions.

The oxyalkylated polybenzoxazines and the other emulsion breakers, if used, can be separately added to the emulsions to be treated. Alternatively or in addition, the oxyalkylated polybenzoxazines and the optional other emulsion breakers can be combined first to provide a demulsifier composition, and the emulsions are contacted with the demulsifier composition containing the oxyalkylated polybenzoxazines and the optional other emulsion breakers.

In addition to the oxyalkylated polybenzoxazines and the optional other emulsion breakers, the demulsifier compositions can further include other components in the formulations. These components may be included to provide formulations with desirable physical properties or stability characteristics for process injection or storage considerations. Exemplary formulation components include solvents such as aromatic hydrocarbons, aliphatic hydrocarbons, alcohols, ethers, ketones, and aldehydes. The demulsifier compositions can be formulated in various forms including, but are not limited to, solutions, dispersions, and the like. Depending on the form of the demulsifier compositions, additives such as water, surfactants, dispersants, or a combination comprising at least one of the foregoing may be present. The amount of the oxyalkylated polybenzoxazines in the demulsifier compositions can be about 1 to about 50 wt % based on the total weight of the demulsifier compositions.

Known additives can be added to enhance the performance of the demulsifier compositions or to provide additional benefits to the products. Exemplary additives to provide additional benefits include viscosity reducers, dispersants, corrosion inhibitors, scale inhibitors, paraffin inhibitors, hydrate inhibitors, sulfide scavengers, and other additives used in the recovery of hydrocarbons from subterranean formations, and the refining thereof, or a combination comprising at least one of the foregoing.

The oxyalkylated polybenzoxazines and the optional additives can be used to break emulsions, including, but are not limited to oil-in-water emulsions, water-in-oil emulsions, water-in-oil-in-water emulsions, oil-in-water-in-oil emulsions, or micro-emulsions. The emulsions contain oil and water. Optionally the emulsions can further contain brines, gases such as hydrocarbon gases, solids, or a combination comprising at least one of the foregoing.

A method of breaking an emulsion comprises contacting the emulsion with the oxyalkylated polybenzoxazines and the optional other emulsion breakers and additives, if used. The contacting can be conducted at a temperature of about −50° C. to about 250° C., for example about −5° C. to about 200° C. or about 20° C. to about 150° C. and a pressure of about 14.7 pounds per square inch absolute (psia) to about 40,000 psia or about 14.7 psia to about 20,000 psia.

With respect to breaking emulsions encountered during the recovery of hydrocarbons from subterranean formations, the oxyalkylated polybenzoxazines are usually introduced into the crude oil emulsions by injection into the crude oil at the wellhead or by injection into the crude oil stream at a point between the wellhead and the oil storage tank. The oxyalkylated polybenzoxazines may be injected in batch mode or continuously.

Refinery desalting emulsions can also be treated with the oxyalkylated poly benzoxazines disclosed herein. In a refinery desalting process, the incoming crude oil is normally deliberately mixed with wash water to remove dissolved salts and other contaminants. To extract water from the resulting emulsion, the emulsion is brought into contact with an effective amount of oxyalkylated polybenzoxazines, after which the crude oil and water phases are separated. The oxyalkylated polybenzoxazines can be introduced with the water and/or the crude oil before mixing of the water and crude oil, at the time of mixing of the water and crude oil, or after the water and crude oil are mixed.

Emulsions that have been treated with oxyalkylated polybenzoxazines are allowed to stand until the desired separation into distinct layers of water and oil results. Once separation into distinct layers of water and oil has been effected, various means known in the art can be utilized for removing the water layer from the crude oil layer.

Set forth are various embodiments of the disclosure.

Embodiment 1. A demulsifier composition comprising: an oxyalkylated polybenzoxazine having repeating units of Formula (I):

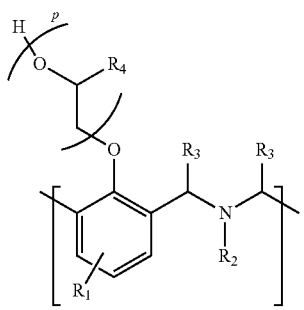

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; $R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl; $R_3$ is hydrogen or a $C_{1-10}$ alkyl; each occurrence of $R_4$ is independently hydrogen or a $C_{1-5}$ alkyl; and p is at least 1.

Embodiment 2. The demulsifier composition as in any prior embodiment, wherein $R_1$ and $R_2$ are each independently a $C_{1-20}$ alkyl group; and each $R_4$ is independently hydrogen or methyl.

Embodiment 3. The demulsifier composition as in any prior embodiment, wherein $R_3$ is hydrogen.

Embodiment 4. The demulsifier composition as in any prior embodiment, further comprising an oxyalkylated phenol aldehyde resin.

Embodiment 5. The demulsifier composition as in any prior embodiment, further comprising dispersants, corrosion inhibitors, scale inhibitors, paraffin inhibitors, hydrate inhibitors, demulsifiers other than the oxyalkylated polybenzoxazine, sulfide scavengers, or a combination comprising at least one of the foregoing.

Embodiment 6. The demulsifier composition as in any prior embodiment, wherein the oxyalkylated polybenzoxazine is present in an amount of about 1 to about 50 wt % based on the total weight of the demulsifier composition.

Embodiment 7. A method of breaking an emulsion, the method comprising: contacting the emulsion with an oxyalkylated polybenzoxazine, the oxyalkylated polybenzoxazine comprising structural units of Formula (I) as described herein.

Embodiment 8. The method of as in any prior embodiment, wherein the emulsion is a crude oil emulsion or a refinery desalting emulsion.

Embodiment 9. The method of as in any prior embodiment, wherein the emulsion comprises oil and water, and one or more of a gas, brine, or solids.

Embodiment 10. The method as in any prior embodiment, wherein an amount of the oxyalkylated polybenzoxazine is about 1 ppm to about 1,000 ppm based on a total weight of the emulsion.

Embodiment 11. The method as in any prior embodiment, wherein an oxyalkylated phenol aldehyde resin is used together with the oxyalkylated polybenzoxazine to break the emulsion.

Embodiment 12. The method as in any prior embodiment, wherein an additive is used together with the oxyalkylated polybenzoxazine to break the emulsion, the additive comprising dispersants, corrosion inhibitors, scale inhibitors, paraffin inhibitors, hydrate inhibitors, demulsifiers other than oxyalkylated polybenzoxazine, sulfide scavengers, or a combination comprising at least one of the foregoing.

Embodiment 13. The method as in any prior embodiment, wherein the contacting is conducted during production, storage, transportation, and refining of a crude oil comprising the emulsion.

Embodiment 14. The method as in any prior embodiment, wherein the contacting is conducted at a temperature of about −50° C. to about 250° C. and a pressure of about 14.7 psig to about 40,000 psig.

Embodiment 15. The method as in any prior embodiment, wherein $R_1$ and $R_2$ are each independently a $C_{1-20}$ alkyl group; and each $R_4$ is independently hydrogen or methyl.

Embodiment 16. The method as in any prior embodiment, wherein $R_3$ is hydrogen.

All ranges disclosed herein are inclusive of the endpoints, and the endpoints are independently combinable with each other. As used herein, "combination" is inclusive of blends, mixtures, alloys, reaction products, and the like. All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." The modifier "about" used in connection with a quantity is inclusive of the stated value and has the meaning dictated by the context (e.g., it includes the degree of error associated with measurement of the particular quantity).

What is claimed is:

1. A demulsifier composition comprising:
an oxyalkylated polybenzoxazine having repeating units of Formula (I):

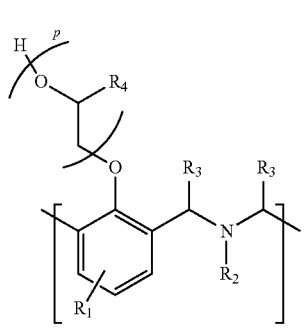

Formula (I)

wherein $R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl;

$R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl;

$R_3$ is hydrogen or a $C_{1-10}$ alkyl;

each occurrence of $R_4$ is independently hydrogen or a $C_{1-5}$ alkyl; and p is at least 1, wherein the demulsifer composition further comprises an oxyalkylated phenol aldehyde resin, dispersants, corrosion inhibitors, scale inhibitors, paraffin inhibitors, hydrate inhibitors, demulsifiers other than the oxyalkylated polybenzoxazine, sulfide scavengers, or a combination comprising at least one of the foregoing.

2. The demulsifier composition of claim 1, wherein $R_1$ and $R_2$ are each independently a $C_{1-20}$ alkyl group; and each $R_4$ is independently hydrogen or methyl.

3. The demulsifier composition of claim 1, wherein $R_3$ is hydrogen.

4. The demulsifier composition of claim 1, further comprising the oxyalkylated phenol aldehyde resin.

5. The demulsifier composition of claim 1, wherein the oxyalkylated polybenzoxazine is present in an amount of about 1 to about 50 wt % based on the total weight of the demulsifier composition.

6. A method of breaking an emulsion, the method comprising:
contacting the emulsion with an oxyalkylated polybenzoxazine, the oxyalkylated polybenzoxazine comprising structural units of Formula (I):

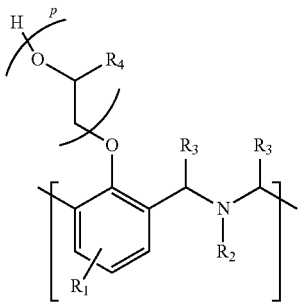

Formula (I)

wherein
$R_1$ is hydrogen, a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl;

$R_2$ is a $C_{1-30}$ alkyl, a $C_{3-30}$ cycloalkyl, a $C_{6-30}$ aryl, a $C_{7-30}$ alkylarylene, a $C_{7-30}$ arylalkyl, a $C_{5-30}$ heteroaryl, or a $C_{3-30}$ heterocycloalkyl;

$R_3$ is hydrogen or a $C_{1-10}$ alkyl;

each occurrence of $R_4$ is independently hydrogen or a $C_{1-5}$ alkyl; and p is at least 1.

7. The method of claim 6, wherein the emulsion is a crude oil emulsion or a refinery desalting emulsion.

8. The method of claim 6, wherein the emulsion comprises oil and water, and one or more of a gas, brine, or solids.

9. The method of claim 6, wherein an amount of the oxyalkylated polybenzoxazine is about 1 ppm to about 1,000 ppm based on a total weight of the emulsion.

10. The method of claim 6, wherein an oxyalkylated phenol aldehyde resin is used together with the oxyalkylated polybenzoxazine to break the emulsion.

11. The method of claim 6, wherein an additive is used together with the oxyalkylated polybenzoxazine to break the emulsion, the additive comprising dispersants, corrosion inhibitors, scale inhibitors, paraffin inhibitors, hydrate inhibitors, demulsifiers other than oxyalkylated polybenzoxazine, sulfide scavengers, or a combination comprising at least one of the foregoing.

12. The method of claim 6, wherein the contacting is conducted during production, storage, transportation, and refining of a crude oil comprising the emulsion.

13. The method of claim 6, wherein the contacting is conducted at a temperature of about −50° C. to about 250° C. and a pressure of about 14.7 psig to about 40,000 psig.

14. The method of claim 6, wherein $R_1$ and $R_2$ are each independently a $C_{1-20}$ alkyl group; and each $R_4$ is independently hydrogen or methyl.

15. The method of claim 6, wherein $R_3$ is hydrogen.

* * * * *